(12) United States Patent
Bolbolan et al.

(10) Patent No.: US 11,015,478 B2
(45) Date of Patent: May 25, 2021

(54) EXHAUST GAS TURBOCHARGER

(71) Applicant: BMTS Technology GmbH & Co. KG, Stuttgart (DE)

(72) Inventors: Daren Bolbolan, Hochdorf (DE); Anatolij Martens, Eislingen (DE); Philipp Martin, Stuttgart (DE); Kinh Toai Pham, Hagen (DE)

(73) Assignee: BMTS Technology GmbH & Co. KG

( * ) Notice: Subject to any disclaimer, the term of this patent is extended or adjusted under 35 U.S.C. 154(b) by 0 days.

(21) Appl. No.: 16/663,992

(22) Filed: Oct. 25, 2019

(65) Prior Publication Data
US 2020/0131926 A1 Apr. 30, 2020

(30) Foreign Application Priority Data

Oct. 26, 2018 (DE) .......................... 102018218395.3

(51) Int. Cl.
*F01D 17/16* (2006.01)
*F02C 6/12* (2006.01)
(Continued)

(52) U.S. Cl.
CPC .............. *F01D 17/165* (2013.01); *F02C 6/12* (2013.01); *F01D 17/143* (2013.01); *F01D 25/24* (2013.01);
(Continued)

(58) Field of Classification Search
CPC ...... F01D 17/143; F01D 17/165; F01D 25/24; F01D 25/246; F02B 37/24; F02C 6/12;
(Continued)

(56) References Cited

U.S. PATENT DOCUMENTS 3,951,393 A * 4/1976 Smirl .................... F16D 13/583
267/161
5,087,176 A 2/1992 Wieland
(Continued)

FOREIGN PATENT DOCUMENTS

DE 10 2008 058 502 A1 5/2010
EP 1 672 177 A1 6/2006
(Continued)

OTHER PUBLICATIONS

English abstract for DE-10 2008 058 502.
English abstract for EP-1 672 177.

*Primary Examiner* — Jesse S Bogue
(74) *Attorney, Agent, or Firm* — Fishman Stewart PLLC

(57) ABSTRACT

The present disclosure relates to an exhaust gas turbocharger, for example for a motor vehicle. The exhaust gas turbocharger includes a turbine including a turbine housing and a turbine wheel, a variable turbine geometry including a vane ring and at least one adjustable guide vane, and a spring arrangement including a disc spring structured and arranged to mechanically impact the vane ring in a direction of the turbine housing. The disc spring extends in a circumferential direction with respect to a rotary axis of the turbine wheel and comprises a disc opening that extends up to a radial inside of the disc spring. A heat shield of the spring arrangement extends in the circumferential direction and is arranged on a side of the disc spring axially facing towards the vane ring.

19 Claims, 2 Drawing Sheets

(51) Int. Cl.
*F02B 37/24* (2006.01)
*F01D 17/14* (2006.01)
*F01D 25/24* (2006.01)

(52) U.S. Cl.
CPC .......... *F02B 37/24* (2013.01); *F05D 2220/40* (2013.01); *F05D 2230/642* (2013.01); *F05D 2260/231* (2013.01); *F05D 2260/30* (2013.01)

(58) Field of Classification Search
CPC .......... F05D 2220/40; F05D 2230/642; F05D 2240/15; F05D 2260/231; F05D 2260/30; F05D 2260/38
See application file for complete search history.

(56) References Cited

U.S. PATENT DOCUMENTS

| | | | | |
|---|---|---|---|---|
| 7,600,969 | B2* | 10/2009 | Frankenstein | F01D 17/16 267/151 |
| 9,121,300 | B2* | 9/2015 | Matsuyama | F02B 37/24 |
| 9,212,700 | B1* | 12/2015 | Bucking | F16O 37/007 |
| 9,664,060 | B2* | 5/2017 | Inoue | F01D 17/16 |
| 10,125,673 | B2* | 11/2018 | Bayod | F01D 17/165 |
| 10,208,660 | B2* | 2/2019 | Bayod | F02B 37/22 |
| 2010/0232937 | A1* | 9/2010 | Wengert | F01D 17/165 415/160 |
| 2012/0237343 | A1 | 9/2012 | Matsuyama | |

FOREIGN PATENT DOCUMENTS

| | | |
|---|---|---|
| WO | 2006/133793 A1 | 12/2006 |
| WO | 2007/104535 A1 | 9/2007 |
| WO | 2015/051 891 A1 | 4/2015 |

\* cited by examiner

EXHAUST GAS TURBOCHARGER

CROSS-REFERENCE TO RELATED APPLICATION

This application claims priority to German Application No. DE 10 2018 218 395.3 filed on Oct. 26, 2018, the contents of which are hereby incorporated by reference in its entirety.

TECHNICAL FIELD

The present invention relates to an exhaust gas turbocharger with a variable turbine geometry and a spring arrangement impacting a vane ring of the variable turbine geometry.

BACKGROUND

A variable turbine geometry is frequently found in an exhaust gas turbocharger, in order to be able to regulate the output of the exhaust gas turbocharger. Such variable turbine geometries normally comprise turbine vanes guided by a vane ring, the vanes being adjustable and thus able to vary the incoming flow of a turbocharger wheel received in a turbine housing. For operational reasons and in particular in the interest of reducing leakage currents, it is advantageous, to mechanically impact the vane ring in direction of the turbine housing. This is normally done by means of a disc ring. In particular due to the rising demands with regard to motor emissions exhaust gas temperatures can sometimes rise to above 1000° C. leading to thermal and chemical stresses occurring in particular in the vicinity of a turbine wheel and which can cause damage to these disc springs when the exhaust gas turbocharger is in operation. In order to avoid or reduce such damages, it is conceivable in principle to manufacture the disc spring from a thermally and/or chemically resistant material, which however leads to an increase in the manufacturing cost of the disc spring and thus of the exhaust gas turbocharger. Moreover such materials as a rule result in unsatisfactory spring properties of the disc spring.

It is known to use a heat shield, which together with the disc spring forms a spring arrangement and which thermally protects the disc spring against the prevailing temperatures in the exhaust gas. The heat shield makes it possible, in particular, the manufacture the disc spring from more cost-effective materials and/or to at least reduce the damage caused by the exhaust gas on the disc spring.

An exhaust gas turbocharger of this kind is known from the EP 1 672 177 A1. The spring arrangement here consists of the disc spring and the heat shield separate therefrom, wherein the heat shield and the dis spring each comprise an opening, via which they are placed on top of a bearing housing of the exhaust gas turbocharger. The heat shield is arranged on the side of the disc spring which in radial direction is of smaller dimensions than the heat shield. The disc spring comprises a shoulder projecting radially outside therefrom axially in direction of the heat shield and the vane ring, via which the disc spring mechanically axially impacts the vane ring, wherein the heat shield is arranged between the shoulder and the vane ring.

The WO 2006/133793 A1 has disclosed a spring arrangement with a heat shield and a vane ring, which are separate from each other, wherein the disc spring is conically formed and the heat shield comprises a kink. The disc spring and the heat shield are radially outside in contact with each other and clamped together at their external diameters.

The disadvantage with these spring arrangements and thus exhaust gas turbochargers consists in the high heat transfer from the heat shield to the disc spring, which is thus exposed to high thermal stresses.

The spring arrangement known from the WO 2007/104535 A1 comprises, in addition to the disc spring and the heat shield, a thermal insulator, which is clamped between the disc spring and the heat shield radially outside of the spring arrangement. The additionally present insulator results in increased manufacturing cost of the spring arrangement and therefore makes assembly of the exhaust gas turbocharger more difficult.

The DE 10 2008 058 502 A1 discloses a spring arrangement, in which the disc spring and the heat shield are each inclined in radial direction and completely spaced apart from one another. Both the heat shield and the disc spring impact the vane ring. The disadvantage consists in the high thermal stress and/or chemical stress on the heat shield, which leads to a reduction in the mechanical effect on the vane ring.

SUMMARY

The present invention is therefore concerned with the objective, to propose an improved or at least alternative embodiment for an exhaust gas turbocharger of the kind mentioned above, which is characterised in particular by an improved impact on the vane ring and/or an improved degree of efficiency of the exhaust gas turbocharger.

According to the invention this objective is achieved by the subject of the independent claim(s). Advantageous embodiments are the subject of the dependent claims.

The present invention is based on the general idea, for a spring arrangement of an exhaust gas turbocharger for mechanically impacting a vane ring, to space apart a disc spring of the spring arrangement impacting the vane ring from a heat shield of the spring arrangement radially outside and to have them contacting each other radially inside. The radially outside spacing between the disc spring and the heat shield leads to no direct heat transfer taking place between the heat shield and the disc spring radially outside. The disc spring impacts the vane ring radially outside, i.e. with its radial outside, in such a way that the spring effect of the disc spring for mechanically impacting the vane ring is not, or only to a limited extent, disadvantageously affected by the spaced-apart arrangement to the heat shield and the thereby reduced heat transfer. Thus with the aid of the spring arrangement, the impact on the vane ring is more efficient and temporally more consistent. In other words, the service life of the spring arrangement, with which the spring arrangement mechanically acts on the vane ring to a sufficient extent, is increased, because the thermal and/or chemical stresses on the disc spring, which occur in operation of the exhaust gas turbocharger due to the exhaust gas, are reduced. In particular undesirable leakages in the region of the vane ring also are avoided for longer, so that the efficiency of the exhaust gas turbocharger is sustained for a longer period and/or improved.

In accordance with the inventive idea the exhaust gas turbocharger comprises a turbine, which comprises a turbine housing, in which a turbine wheel is received. In operation the turbine wheel is subject to the oncoming exhaust gas flow and can drive a compressor wheel of the turbocharger, for example via a shaft. The variable turbine geometry, apart from the vane ring, comprises at least one adjustable guide vane, which is guided by the vane ring, in particular is mounted in it. The spring arrangement comprises the disc spring and the heat shield and impacts the vane ring mechanically in direction of the turbine housing, in particular axially. The disc spring comprises a disc opening, which extends as far as a radial inside of the disc spring. The heat shield comprises a shield opening, which extends as far as a radial inside of the heat shield. The heat shield is arranged on the side of the disc spring axially facing the vane ring. According to the invention the heat shield is axially spaced apart radially outside from the disc spring and is supported radially inside by the disc spring in at least one support section.

The radially outside spacing between the heat shield and the disc spring means, that a radial outside of the heat shield, which extends in a circumferential direction, is axially spaced apart from the disc spring. Preferably this leads to a gap, in particular an air gap, being formed radially outside between the heat shield and the disc spring. As a result, the radially outside heat transfer between the heat shield and the disc spring is further reduced.

The openings of the disc springs and the heat shield, that is the disc opening and the shield opening, are advantageously arranged so as to be aligned with each other. The openings are provided in particular for the purpose of placing the spring arrangement onto a component of the exhaust gas turbocharger, in particular onto a bearing housing of the exhaust gas turbocharger, in which the shaft is mounted and which can comprise an axially protruding shoulder for the placement of the spring arrangement. It is preferable if the disc opening is arranged centrally in the disc spring and/or the shield opening is arranged centrally in the heat shield.

The mechanical impact on the vane ring in direction of the turbine housing takes place via the disc spring. Thus the vane ring is axially pre-tensioned by the disc spring in direction of the turbine housing. The mechanical impact on the vane ring conveniently has the effect that at least one of the guide vanes of the variable turbine geometry is mechanically impacted on its face facing away from the vane ring axially in direction of the turbine housing, in particular is in contact with the turbine housing or a cover disc arranged between the turbine housing and the at least one guide vane, so that the flow of the exhaust gas along this face, and thus undesirable leakages, are prevented or at least reduced.

In order to mechanically impact the vane ring the disc spring is advantageously supported, on the axial side facing away from the vane ring, against a component of the exhaust gas turbocharger, in particular against the bearing housing. In particular the disc spring is in contact with this component, in particular with the bearing housing.

The directions given here refer in particular to the rotary axis of the turbine wheel or an extension of a shaft of the exhaust gas turbocharger, onto which the turbine wheel is non-rotatably mounted. Axial therefore means in particular along the rotary axis/the shaft and radially means an extension radially thereto. A circumferential direction also refers to this extension and thus extends around the axial direction.

Embodiments are preferred, in which the heat shield is fully spaced apart radially outside from the disc spring. As a result direct heat transfer between the heat shield and the disc spring is prevented or at least reduced in the radially outside region of the heat shield.

With preferred embodiments the heat shield is spaced apart radially outside from the vane ring, in particular with a radially outside end. Thus heat transfer from the vane to the heat shield is prevented or at least reduced, so that heat transfer to the disc ring is also altogether reduced. Conveniently the heat shield is at least axially, preferably fully, spaced apart from the vane ring. Preferably a gap, in particular an air gap, is formed between the heat shield and the vane ring. Here the vane ring may serve as radially outside protection for the heat shield.

Embodiments have proven to be advantageous, in which the heat shield, in at least two such support sections, is supported radially inside on the disc spring. The support sections are separated from each other by separating sections in circumferential direction, wherein the heat shield and the disc spring are loose in relation to each other in the separating sections. This means in particular, that the heat shield and the disc spring are not fixed to each other in the separating sections. The contact region between the disc spring and the heat shield is reduced radially inside, so that direct heat transfer from heat shield to disc spring is further reduced. The support sections and the separating sections are conveniently annularly arranged one after another, i.e. sequentially in circumferential direction.

The respective support section extends in circumferential direction over a part angle. It is preferred, if the sum of all part angles of the support sections is less than 75°. The sum of all part angles may for example be between 60° and 75°. Consequently the contact region between the disc spring and the heat shield is reduced, in particular minimised. In accordance therewith the heat transfer between heat shield and disc spring is reduced. This showed that at the same time the said angle region leads to sufficiently high mechanical stability of the spring arrangement and to minimal heat transfer from heat shield to disc spring.

Embodiments are preferred in which the part angles are of equal size, respectively.

Advantageous embodiments are those, in which altogether three such support sections are provided, these being evenly distributed in circumferential direction and/or extending across the same part angle, respectively. Such a design offers advantageous mechanical properties of the spring arrangement with simultaneously reduced heat transfer from the heat shield to the disc spring.

Preferred embodiments are deemed to be embodiments, in which the disc spring and the heat shield are exclusively contacted radially inside and spaced apart in all other respects. Direct heat transfer therefore takes place exclusively radially inside, so that heat transfer from heat shield to disc spring is further reduced.

Advantageously a gap, in particular an air gap, is formed between the disc spring and the heat shield outside of the radially adjoining region on at least one support section, which air gap extends preferably uninterruptedly in circumferential direction.

According to preferred embodiments the respective separation section adjoins the adjacent support sections in circumferential direction. This means that there are no further support sections between the separating sections and the support sections in circumferential direction. As a result the heat shield is in contact radially inside with either the support sections on the disc spring or is, in the separating sections, spaced apart loosely, in particular axially, from the disc spring. This means in particular that direct contact between the heat shield and the disc spring exists preferably exclusively radially inside, and there exclusively in the separating sections. In this way heat transfer from the heat shield to the disc spring is further reduced.

A further reduction in heat transfer from the heat shield to the disc spring can be achieved in that the radial width of the respective support section is reduced, in particular minimised. The ratio between the radial support width of the respective support section and the disc width between the radial inside and the radial outside of the disc spring, i.e. in particular the difference between an outer diameter and an inner diameter of the disc spring, may be between 1:7 and 1:8. This means that the support width corresponds to between one eighth and one seventh of the disc width.

The heat shield and the disc spring are preferably formed closed in circumferential direction. Alternatively or additionally the heat shield may completely cover the disc spring radially.

Embodiments are also possible, in which the heat shield has a smaller outer diameter than the disc spring. Consequently the heat shield is spaced apart radially outside and also radially to the radial outside of the disc spring.

Embodiments are preferred, in which the vane ring is stepped on the side facing the disc spring. The stepped design of the vane ring is such that the vane ring comprises an outside step which protrudes in direction of the disc spring and preferably extends radially and in circumferential direction, with the disc spring impacting thereon preferably directly in order to mechanically act on the vane ring. In particular the disc spring impacts the outside step radially outside. Thus on the one hand the mechanical impact on the vane ring is improved, whilst on the other hand an additional thermal and/or chemical protection of the disc spring is achieved.

Due to the stepped design the vane ring advantageously also comprises an inside step protruding in direction of the heat shield and extending preferably radially in circumferential direction, wherein the inside step is arranged radially inside of the outside step. The heat shield is spaced apart radially outside axially to the inside step. Consequently the heat shield is covered radially outside by the inside step of the vane ring, so that in operation the exhaust gas flow radially outside is prevented or at least considerably reduced between heat shield and disc spring. Consequently the respective load/damage to the disc spring is reduced.

In circumferential direction the inside step and/or the outside step are preferably closed. As a result the impact on the vane ring becomes more homogenous in circumferential direction aided by the disc spring and/or the reduced exhaust gas flow between heat shield and disc spring is realised along the entire circumferential direction.

Embodiments are preferred, in which the heat shield and the disc spring are fixed to one another. This simplifies handling of the spring arrangement, so that assembly of the exhaust gas turbocharger is simplified.

Preferably the heat shield and the disc spring are fixed to one another in at least one of the support sections. It is especially preferred if the heat shield and the disc spring are exclusively fixed to one another in the at least one support section.

Fixing of the heat shield and the disc spring is preferably realised in a material-locked manner, for example by welding.

Especially preferably fixing of the heat shield and the disc spring to one another is realised in at least one of the support sections merely in parts of the support section, in particular in a spot-like manner. This means that the heat shield and the disc spring, are fixed to one another preferably exclusively in at least one of the support sections and there in a partial section respectively, in particular in a spot-like manner. The fixing of the heat shield and the disc spring movably in a partial section of the at least one support section leads to a further reduction in heat transfer from heat shield to disc spring. Embodiments are feasible, in which the heat shield and the disc spring are spot-welded to one another exclusively in at least one of the support sections, preferably exclusively in the respective support section.

The heat shield is advantageously realised as a heat protection plate. The spring arrangement can thus be manufactured in a cost-effective and simple manner. Moreover such a design of the heat shield offers an effective thermal and/or chemical protection for the disc spring against the exhaust gas. Furthermore the heat shield can thus better balance any thermal changes.

The exhaust gas turbocharger may be used in principle in a combustion engine system in any application. It is feasible in particular to use the exhaust gas turbocharger in a motor vehicle.

Further important features and advantages of the invention are revealed in the sub-claims, the drawings and the associated figure description with reference to the drawings.

It is understood that the above mentioned features and other features to be explained below can be used not only in the respectively revealed combination but also in other combinations or on their own without leaving the scope of the present invention.

Preferred exemplary embodiments of the invention are shown in the drawings and will be explained in detail in the description below, wherein identical reference symbols refer to identical or functionally identical components.

DETAILED DESCRIPTION

Figure 1:
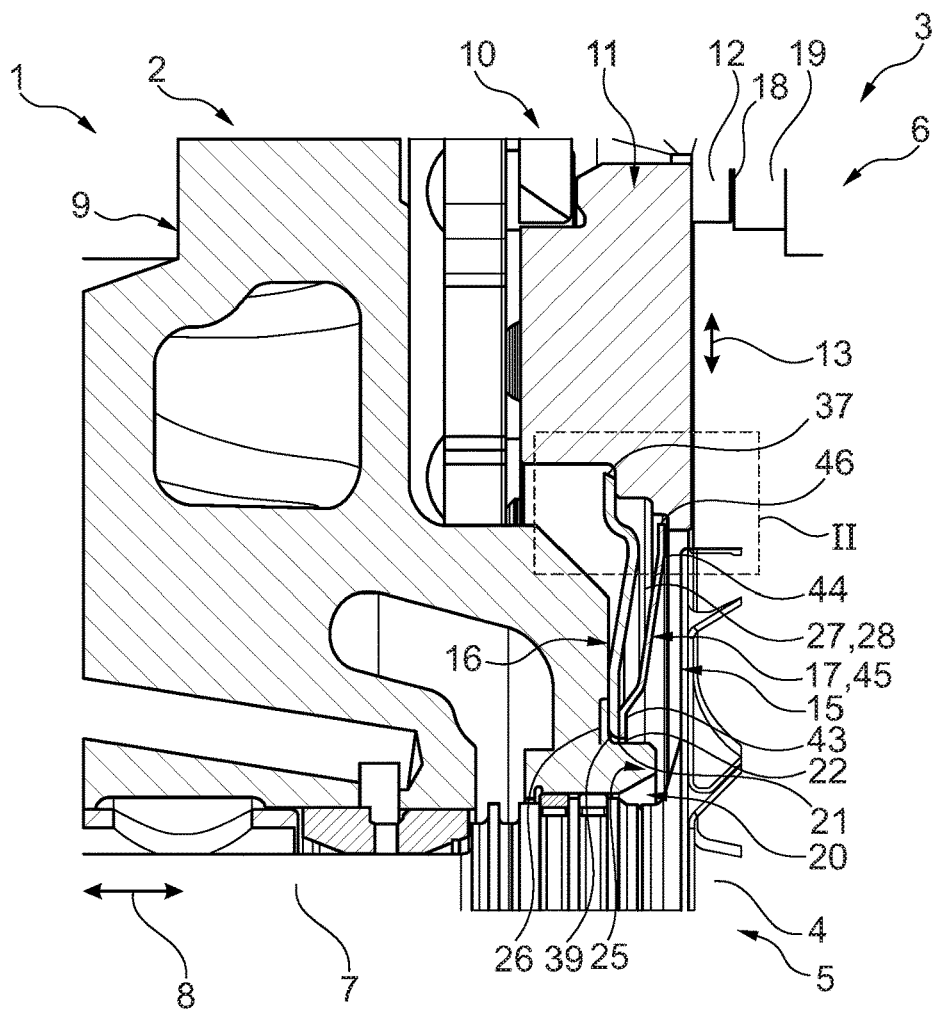
FIG. 1 a section through an exhaust gas turbocharger with a spring arrangement, FIG. 2 an enlarged view of the region marked with II in FIG. 1, FIG. 3 a plan view of the spring arrangement, FIG. 4 a section through the spring arrangement viewed in the direction marked with IV in FIG. 3.

The exhaust gas turbocharger 1, as shown by way of example in FIG. 1, is part of a combustion engine system 2, which apart from the exhaust gas turbocharger 1 comprises a combustion engine not shown, the exhaust gas of which, which arises during operation, is fed to the exhaust gas turbocharger, in order to, in particular, compress the air to be fed to the combustion engine. The exhaust gas turbocharger 1/the combustion engine system 2 may be part of a vehicle 3 not shown otherwise.

The exhaust gas of the combustion engine is fed to a turbine wheel 4 of a turbine 5 of the exhaust gas turbocharger 1, thereby driving the turbine wheel 4. The turbine wheel 4, which is merely hinted at in FIG. 1, is rotatably received in a turbine housing 6 of the turbine 5. The turbine wheel 4 is non-rotatably mounted on a shaft 7, which extends along an axial direction 8 and is rotatably mounted in a bearing housing 9 of the exhaust gas turbocharger 1. FIG. 1 shows a part of a section through the exhaust gas turbocharger 1, the section extending through the shaft 7 and the turbine wheel 4 along an axial direction 8 extending parallel to the rotary axis of the turbine wheel 4, in the region of the turbine 5 and the adjacent bearing housing 9.

The exhaust gas turbocharger 1 further comprises a variable turbine geometry 10, which with the aid of at least one adjustable guide vane 12 can change the oncoming flow of the exhaust gas on the turbine wheel and thus vary the output of the exhaust gas turbocharger 1. The respective guide vane 12 is arranged spaced apart from the turbine wheel 4 in a radial direction 13, wherein the guide vanes 12 are arranged one behind the other in a circumferential direction 14 (see for example FIG. 3) in such a way as to surround the turbine wheel 4 in an annular manner. In FIG. 1 merely one such guide vane 12 is visible. The guide vanes 12 are adjustably guided by a vane ring 11 of the variable turbine geometry 10. A spring arrangement 15 comprising a disc spring 16 and a heat shield 17 acts with the disc spring 16 axially upon the vane ring 11 in direction of the guide vanes 12/the turbine housing 6. The respective guide vane 12 is thus impacted axially in direction of the housing 6. Consequently a face 18 of the guide vane 12 facing away from the vane ring 12 is axially pressed in direction of the turbine housing 6, so that exhaust gas leakage flows along the face 18 are prevented or at least reduced. In the example shown a preferably annular cover plate 19 is arranged between the guide vane 12 and the turbine housing 6, against which the guide vane 12 is pressed with its face 18 due to the mechanical impact.

Figure 3:
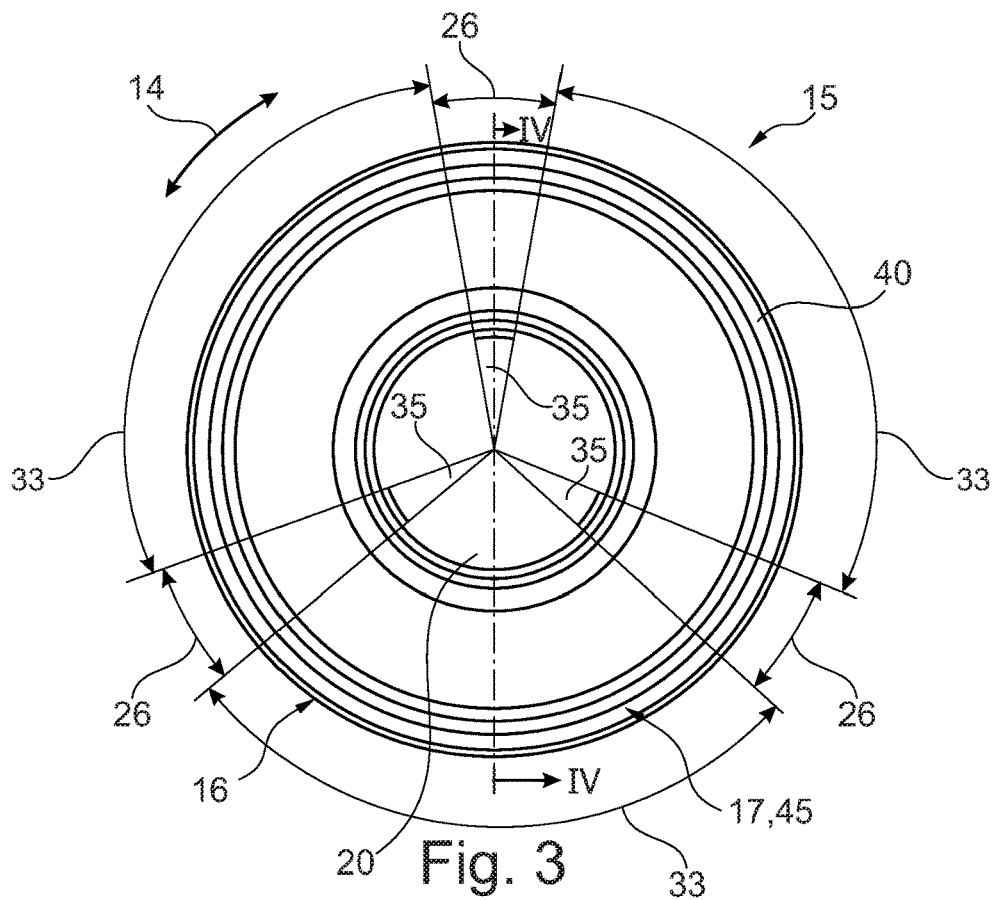
Figure 4:
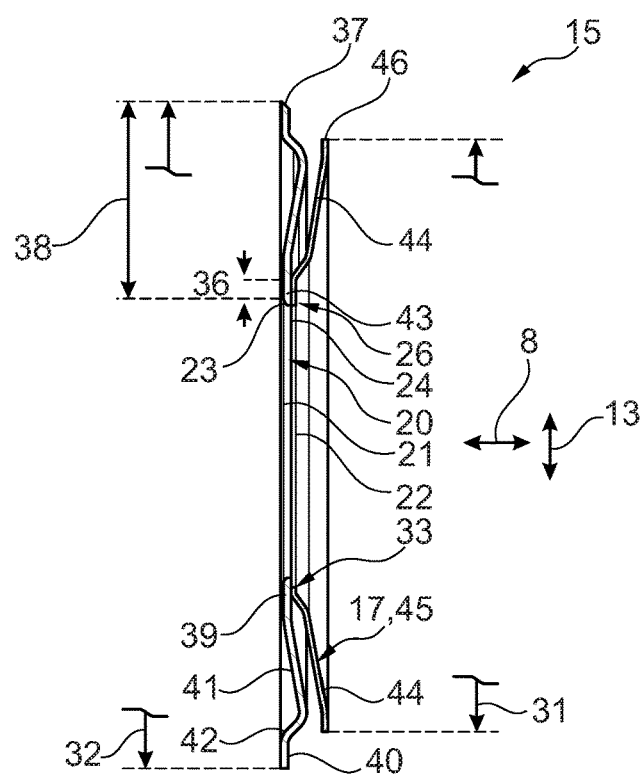

The spring arrangement 15 is shown separately in FIGS. 3 and 4, wherein FIG. 3 shows a plan view of the spring arrangement 15 and FIG. 4 shows a section through the spring arrangement 15 along the axial direction 8, as hinted at with IV in FIG. 3. The spring arrangement 15 comprises a central opening 20, which is formed by a disc opening 21 of the disc spring 16 and a shield opening 22 of the heat shield 17, which are arranged so as to be aligned with each other. The respective opening 21, 22 extends radially as far as a radial inside of the disc spring 16/the heat shield 17. This means that the disc opening 21 extends radially up to a radial inside 23 of the disc spring and that the shield opening 22 extends up to a radial inside 24 of the heat shield 17. In the example shown the spring arrangement 15 is attached with its opening 20 to the bearing housing 9. To this end the bearing housing 9, on its face, comprises a shoulder 25 axially protruding in direction of the turbine wheel 4 and uninterruptedly extending in circumferential direction 14, which shoulder is inserted into the opening 20 of the spring arrangement 15 and thus into the disc opening 21 and the shield opening 22. In this position the disc spring 16 is radially inside in contact axially with the bearing housing 9, and in other respects is spaced apart from the bearing housing 9. Radially outside the disc spring 16 is axially in contact with the vane ring 11 so as to impact the same. The heat shield 17 is arranged axially on the side of the disc spring 16 facing the turbine wheel 4/the vane ring 11.

The heat shield 17 is supported radially inside on the disc spring 16 in at least one support section 26 extending in circumferential direction 14 and is thus axially spaced apart radially outside from the disc spring 16. In the example shown, in particular in FIG. 3, three such support sections 26 are provided, which are evenly distributed in circumferential direction 14. Contact between the heat shield 17 and the disc spring 16 exclusively exists in the at least one support section 26, so that in other respects a gap 27, i.e. an air gap, which in the example shown is empty, is formed between the heat shield 17 and the disc spring 16.

Figure 2:
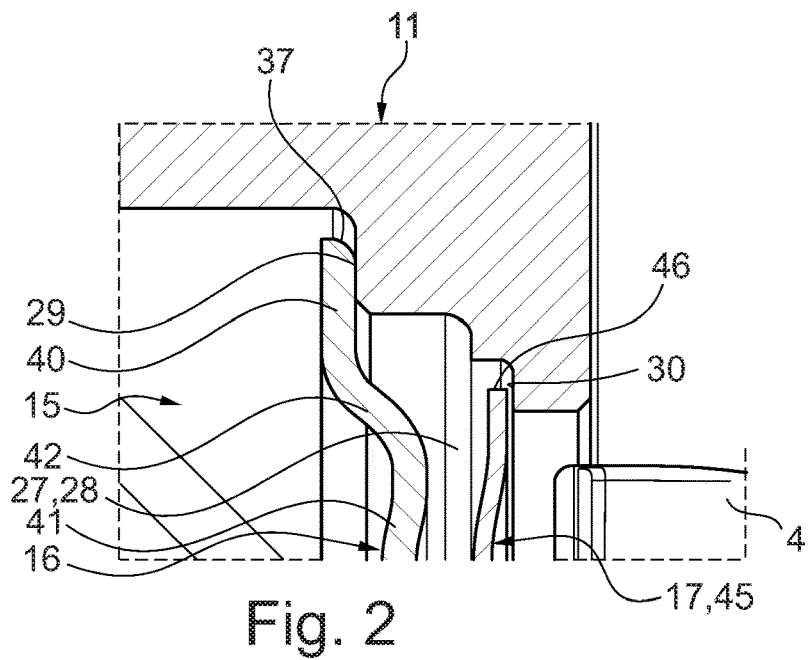

In the example shown, the heat shield 17 is, as depicted in FIGS. 1 and 2, completely spaced apart from the vane ring 11. In particular the heat shield 17 is axially and radially spaced apart radially outside of the vane ring 11. As further revealed in FIGS. 1 and 2, the vane ring 11 is stepped on the side facing the spring arrangement 15, in such a way that the vane ring 17 comprises an outside step 29 protruding in direction of the disc spring 16, lying radially outside and uninterruptedly extending in circumferential direction 14, the disc spring 16 being supported with its radial outside on this step and axially acting thereon in order to impact the vane ring 11 mechanically axially, as has been described. Due to the stepped design the vane ring 11 additionally comprises a radially extending inside step 30 arranged radially inside of the outside step 29, the inside step 30 extending along the radial outside 46 of the heat shield 17 and from which the heat shield 17 is axially spaced apart such that the vane ring 11 with its inside step 30 shields the radial outside 46 of the heat shield 17 against the exhaust gas flowing in direction of the turbine wheel 4. The radial outside 46 of the heat shield 17 is spaced radially apart from the radial outside 37 of the disc spring 16 and spaced axially fully apart from the disc spring 16. Therefore there is, on the one hand, no direct heat transfer from the vane ring 11 to the heat shield 17 and on the other hand protection from the exhaust gas is provided for the heat shield 17 radially outside of the heat shield 17 with the aid of the vane ring 11. As revealed further in the figures, the disc spring 16 in this example is dimensioned radially larger than the heat shield 17. This means that the outer diameter 31 of the heat shield 17 is smaller than an outer diameter 32 of the disc spring 16.

As revealed in particular in FIG. 3, the support sections 26 are separated from each other by separating sections 33 in circumferential direction 14. The separating sections 33 follow the associated support sections 26 in circumferential direction 14, wherein they extend between these support sections 26 and thus are adjoining the support sections 26. A fixing of the disc spring 16 on the heat shield 17 is effected exclusively in the support sections 26. In the separating sections 33 the disc spring 16 and the heat shield 17 are not attached (i.e. loose) to each other. Direct heat transfer from the heat shield 17 to the disc spring 16 therefore takes place exclusively radially inside, wherein this radial inside is covered by a back side 34 of the turbine wheel 4, which faces, and is spaced apart from, the spring arrangement 15. The disc spring 16 and the heat shield 17 are also axially spaced apart from each other in the separating sections 33, so that direct transfer from the heat shield 17 to the disc spring 16 takes place exclusively in the support sections.

The direct heat transfer from the heat shield 17 to the disc spring 16 taking place in the support sections 26 can be further reduced in that the fixing of the disc spring 16 to the heat shield 17 takes place exclusively in the support sections 26 and there merely intermittently, in particular spot-like. Preferably this is done by a material-locked connection. Especially preferably the disc spring 16 and the heat shield 17 are fixed to each other exclusively in the support sections 26 by means of spot-welding.

As revealed in FIG. 3, the respective support section 26 extends in circumferential direction 14 over a part angle 35, wherein in the example shown the part angles 35 of all support sections 26 are essentially identically sized and are between 20° and 25°. The sum of all part angles 35 is thus between 60° and 75°. In other terms this means that the separating sections 33 in the example shown extend altogether between 285° and 300° in circumferential direction 14, wherein the separating sections 33 in the example shown are essentially identically sized.

As further revealed in particular in FIG. 4, a radial support width 36 of the respective support section 26 is considerably smaller than a disc width 38 of the disc spring 16 radially extending between the radial inside 23 and a radial outside 37 of the disc spring 17. In particular the ratio between the support width 36 and the disc width 38 is between 1:7 and 1:8.

FIGS. 1 and 4 further reveal that the disc spring 16 comprises a radially inside inner section 39, with which the disc spring 16 is axially in contact with the bearing housing 9. The inner section 39 is radially larger than the respective support section 26. The disc spring 16 also comprises an outer section 40 lying radially outside, with which the disc spring 17 acts axially on the vane ring 11, in particular is in contact with the vane ring 11. The inner section 39 and the outer section 40 of the disc spring 17 each extend radially and are advantageously located in the same plane when the disc spring is in the state shown. An intermediate section 41 of the disc spring 17 extends between the inner section 39 and the outer section 40, which adjoins the inner section 39c, is radially inclined towards the heat shield 17 and transitions into the outer section 40 via a radially shorter transition section 42 radially extending in the opposite direction.

The heat shield 17 comprises an inner section 43 lying radially inside, which extends radially and is radially smaller than the inner section 39 of the disc spring 16. The support sections 26 are arranged within the inner section 39. The radial inner section 43 is joined radially outside to a radially inclined heat shield 17 connecting section 44 pointing away from the disc spring 16.

As revealed in particular in FIG. 3, the spring arrangement 15 and thus the disc spring 16 and the heat shield 17 are formed uninterruptedly in circumferential direction. The same applies analogously to the outside step 29 and the inside step 30 of the vane ring 11.

In the examples shown the heat shield 17 is realised as a heat protection plate 45 and comprises a lesser wall thickness than the disc spring 16.

The invention claimed is:

1. An exhaust gas turbocharger, comprising:
a turbine including a turbine housing and a turbine wheel received in the turbine housing,
a variable turbine geometry including a vane ring and at least one adjustable guide vane that is guided by the vane ring,
a spring arrangement including a disc spring structured and arranged to mechanically impact the vane ring in a direction of the turbine housing, the disc spring extending in a circumferential direction with respect to a rotary axis of the turbine wheel and comprising a disc opening, wherein the disc opening extends up to a radial inside of the disc spring,
a heat shield of the spring arrangement, the heat shield extending in the circumferential direction and arranged on a side of the disc spring axially facing towards the vane ring, wherein the heat shield comprises a shield opening that extends up to a radial inside of the heat shield,
wherein the heat shield is supported radially inside on the disc spring in at least one support section and is axially spaced apart radially outside from the disc spring, and
wherein the heat shield is axially and radially spaced apart radially outside from the vane ring.

2. The exhaust gas turbocharger according to claim 1, wherein the heat shield and the disc spring contact one another exclusively in the at least one support section such that a gap is provided radially outside between the heat shield and the disc spring.

3. The exhaust gas turbocharger according to claim 1, wherein:
the heat shield is supported radially inside on the disc spring in at least two support sections,
the at least two support sections are separated from each other in the circumferential direction by separating sections, and
the heat shield and the disc spring are arranged loosely to each other in the separating sections.

4. The exhaust gas turbocharger according to claim 3, wherein:
the at least two support sections respectively extend over a part angle in the circumferential direction, and
the sum of all part angles of the at least two support sections is between 60° and 75°.

5. The exhaust gas turbocharger according to claim 3, wherein the separating sections respectively adjoin adjacent support sections of the at least two support sections in the circumferential direction.

6. The exhaust gas turbocharger according to claim 3, wherein the disc spring and the heat shield are axially spaced apart from each other in at least one of the separating sections.

7. The exhaust gas turbocharger according to claim 1, wherein the at least one support section has a radial support width, and wherein a ratio between the radial support width and a disc width extending from the radial inside of the disc spring to a radial outside of the disc spring is between 1:7 and 1:8.

8. The exhaust gas turbocharger according to claim 1, wherein the heat shield has a smaller outer diameter than the disc spring.

9. The exhaust gas turbocharger according to claim 1, wherein the vane ring is stepped on a side facing towards the spring arrangement, and includes an outside step protruding in a direction of the disc spring, wherein the outside step is structured and arranged to be impacted by the disc spring.

10. The exhaust gas turbocharger according to claim 9, wherein the vane ring further includes an inside step protruding in a direction of the heat shield, wherein the inside step is arranged radially inside of the outside step and the heat shield is axially spaced apart radially outside from the inside step.

11. The exhaust gas turbocharger according to claim 1, wherein the disc spring and the heat shield are fixed to one another in the at least one support section.

12. The exhaust gas turbocharger according to claim 11, wherein the disc spring and the heat shield are fixed to one another exclusively in the at least one support section.

13. The exhaust gas turbocharger according to claim 1, wherein the disc spring and the heat shield are fixed to one another in the at least one support section via a spot welded connection.

14. A motor vehicle, comprising:
an exhaust gas turbocharger, the exhaust gas turbocharger including:
a turbine including a turbine housing and a turbine wheel received in the turbine housing;
a variable turbine geometry including a vane ring and at least one adjustable guide vane that is guided by the vane ring;
a spring arrangement including a disc spring structured and arranged to mechanically impact the vane ring in a direction of the turbine housing, the disc spring extending in a circumferential direction with respect to a rotary axis of the turbine wheel and comprising a disc opening, wherein the disc opening extends up to a radial inside of the disc spring;
a heat shield of the spring arrangement, the heat shield extending in the circumferential direction and arranged on a side of the disc spring axially facing towards the vane ring, wherein the heat shield comprises a shield opening that extends up to a radial inside of the heat shield;

wherein the heat shield is supported radially inside on the disc spring in at least one support section and is axially spaced apart radially outside from the disc spring; and wherein the heat shield is axially and radially spaced apart radially outside from the vane ring.

15. The motor vehicle according to claim 14, wherein the heat shield is supported radially inside on the disc spring in at least two support sections, and the at least two support sections are separated from each other in the circumferential direction by separating sections, wherein the at least two support sections respectively extend over a part angle in the circumferential direction, and the sum of all part angles of the at least two support sections is between 60° and 75°.

16. The motor vehicle according to claim 14, wherein the disc spring and the heat shield are fixed to one another exclusively in the at least one support section via a spot welded connection.

17. The motor vehicle according to claim 14, wherein the vane ring is stepped on a side facing towards the spring arrangement, and includes an outside step protruding in a direction of the disc spring, wherein the outside step is structured and arranged to be impacted by the disc spring.

18. The motor vehicle according to claim 17, wherein the vane ring further includes an inside step disposed radially inside of the outside step, and wherein the heat shield is axially spaced apart radially outside from the inside step of the vane ring.

19. An exhaust gas turbocharger, comprising:
a turbine including a turbine housing and a turbine wheel received in the turbine housing;
a variable turbine geometry including a vane ring and at least one adjustable guide vane that is guided by the vane ring;
a spring arrangement including a disc spring structured and arranged to mechanically impact the vane ring in a direction of the turbine housing, the disc spring extending in a circumferential direction with respect to a rotary axis of the turbine wheel and comprising a disc opening, wherein the disc opening extends up to a radial inside of the disc spring;
a heat shield of the spring arrangement, the heat shield extending in the circumferential direction and arranged on a side of the disc spring axially facing towards the vane ring, wherein the heat shield comprises a shield opening that extends up to a radial inside of the heat shield;
wherein the heat shield is supported radially inside on the disc spring in at least one support section and is axially spaced apart radially outside from the disc spring;
wherein the heat shield is supported radially inside on the disc spring in at least two support sections, the at least two support sections are separated from each other in the circumferential direction by separating sections, and the heat shield and the disc spring are arranged loosely to each other in the separating sections; and
wherein the at least two support sections respectively extend over a part angle in the circumferential direction, and the sum of all part angles of the at least two support sections is between 60° and 75°.

\* \* \* \* \*